Figure 5:
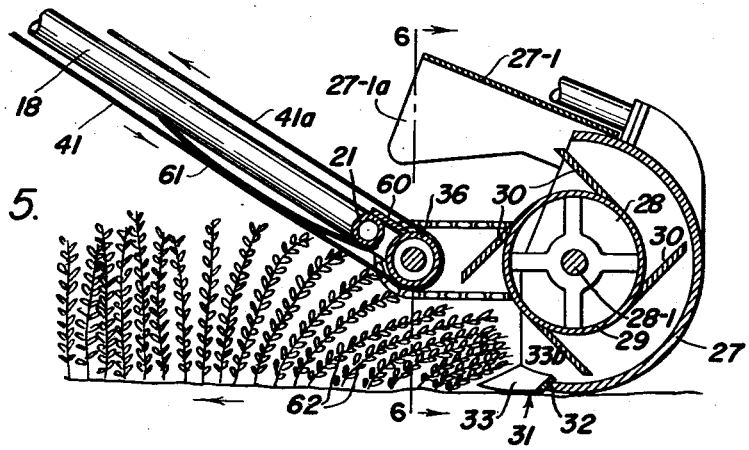

April 6, 1954 W. H. HANSEN 2,674,081
CUTTING AND CHOPPING MACHINE FOR FIELD CROPS
Filed Sept. 5, 1950 2 Sheets-Sheet 1
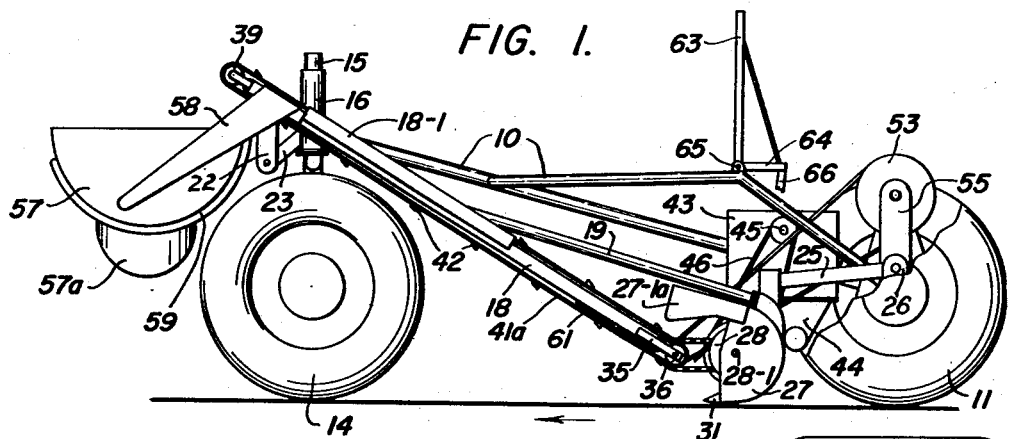
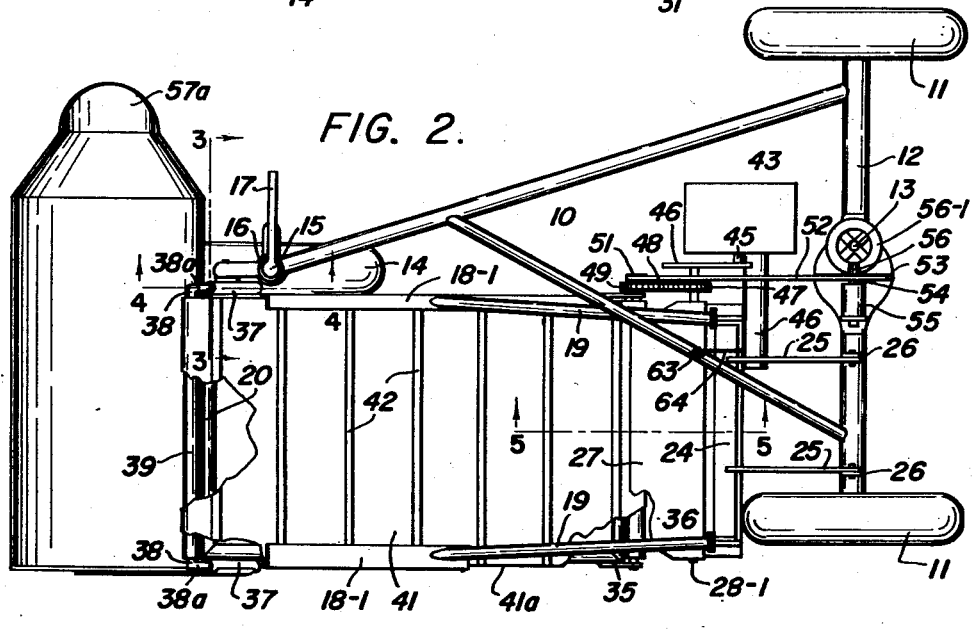
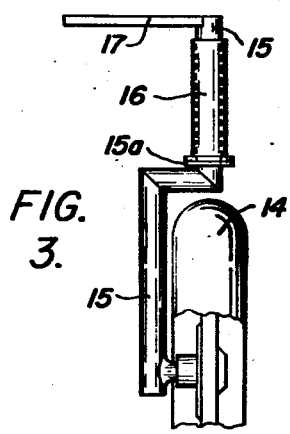
Inventor:
WALTER H. HANSEN,
Attorneys.

April 6, 1954        W. H. HANSEN        2,674,081

CUTTING AND CHOPPING MACHINE FOR FIELD CROPS

Filed Sept. 5, 1950        2 Sheets-Sheet 2

Inventor:
WALTER H. HANSEN,
Attorneys.

Patented Apr. 6, 1954

2,674,081

UNITED STATES PATENT OFFICE 2,674,081

CUTTING AND CHOPPING MACHINE FOR FIELD CROPS

Walter H. Hansen, Ephraim, Utah

Application September 5, 1950, Serial No. 183,243

10 Claims. (Cl. 56—156)

This invention relates to machines for simultaneously cutting and chopping field crops, particularly standing forage crops, such as alfalfa.

I have found that all machines of this type that are presently available on the market are too large and expensive to be practical for use by poultrymen for cutting relatively small daily requirements of fresh greens for feeding purposes, and, furthermore, have various disadvantages in operation.

In order to effectively and efficiently chop long stalks of standing forage crops into the small pieces satisfactory for immediate use as poultry feed, or for processing into various composition animal feed products, I utilize a rotary cutter revolving at high speed relative to the speed of travel of the machine through the field. Furthermore, I employ an endless belt in advance of the rotary cutter, for bending the standing crops down toward the cutter as the machine travels.

I am aware that, broadly speaking, this has been done before. In United States Patent No. 2,496,493 issued to R. R. Raney on February 7, 1950, there is shown such a combination in a hay gatherer and chopper.

I have found, however, that for all around satisfactory results more than this general combination is required. In practically all instances, especially where the stand of vegetation is heavy, as is usual in the instance of alfalfa and of various other forage crops, the stalks have a tendency to become matted or bunched and to clog the machine, and, where this occurs, even though the machine is able to continue operation and to cut through such matted or bunched stalks, a portion of the stalks is always forced against the ground and passed over without being cut.

In accordance with the invention, I avoid this difficulty by providing a transverse series of spaced, longitudinally extending shear bars immediately in advance of a transversely extending primary shear bar to establish a relatively broad shearing zone for the rotary cutter, such shearing zone having a plurality of open entry channels, and, further, by sloping the body of the primary shear bar from substantially ground level backwardly and upwardly between the longitudinally extending shear bars to the shear edge of such primary shear bar, whereby a positive guide surface for feeding vegetation to such primary shear edge, and for supporting it during the successive shearing operations, is provided.

In order to lift the vegetation for most advantageous entry into the shearing zone, the longitudinally extending, advance shear bars have forward portions formed as teeth which are inclined rearwardly and upwardly leading directly into the shearing zone of the cutter.

Accordingly, a principal object of the invention is to provide a machine of the type concerned, which will effectively cut and chop standing forage crops without danger of becoming clogged, and which will cut cleanly as it travels through a field.

While I prefer to utilize the upwardly and rearwardly sloping primary shear bar in conjunction with the forwardly and longitudinally extending secondary shear bars, as set forth above, I have found that the former can even be used alone in certain instances—as where the stand of vegetation is not heavy—to give superior results over prior machines.

The patented machine referred to above utilizes a cumbersome auger and blower system for conveying the chopped hay to a truck or other receiving agency. I have found that this is neither necessary, nor desirable, since, by the utilization of a suitable housing enclosing the back of the rotary cutter, a blast of chopped material is directed forwardly and onto the upper run of the endless belt employed for feeding the standing crop into the cutter. Thus, the endless belt becomes operative also as a conveyor for removal and discharge of the chopped vegetation.

Another important object of the invention, therefore, is to eliminate cumbersome conveying equipment, and to make the endless belt serve a double purpose, thereby making possible an unusually compact, lightweight, and low cost machine.

Since I have found that the interior surface of the endless belt and mechanism associated therewith have a tendency to become packed with masses of cut greens, I provide, as a further object and feature of the invention, means for rendering such mechanism self-cleaning during operation of the machine.

Additional objects and features of the invention will become apparent from the following detailed description of the particular preferred embodiment illustrated in the accompanying drawings for the purpose of exemplifying the novel inventive concepts involved.

Figure 6:
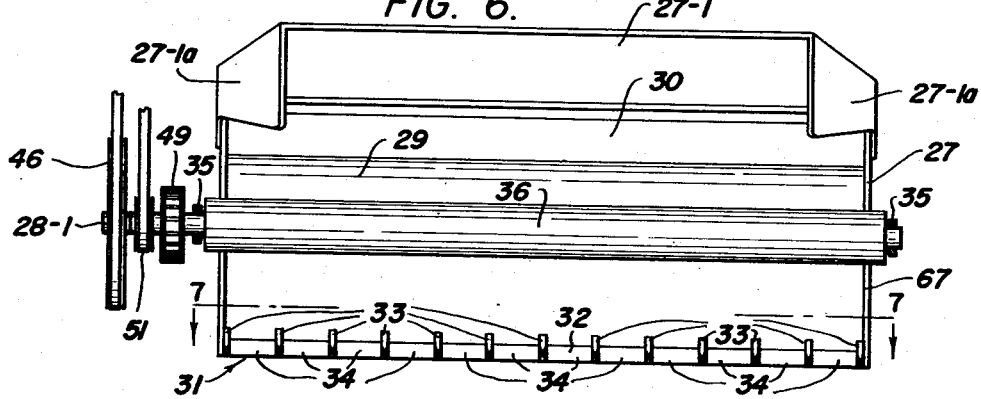
Figure 7:
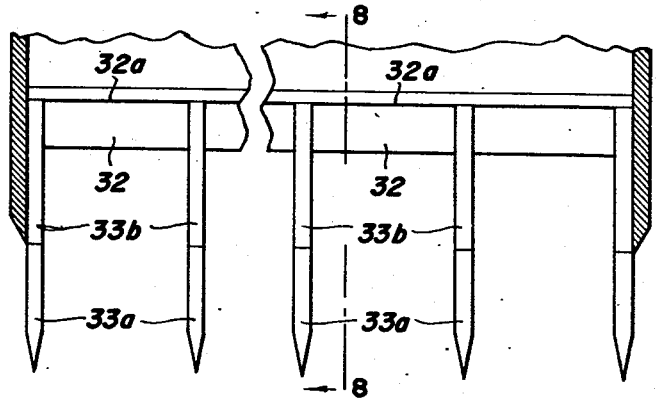
Figure 8:
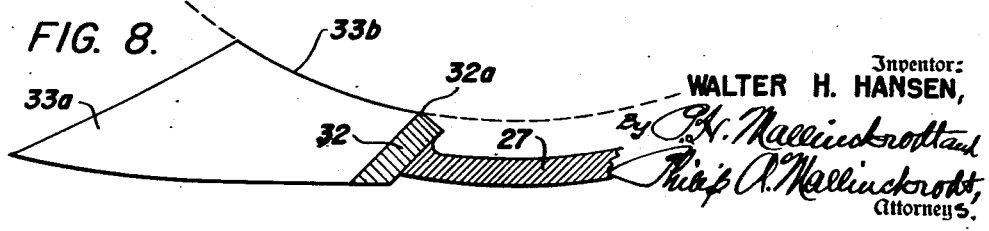

In the drawings:

Fig. 1 represents a side elevation of a lightweight, self-propelled machine of the invention, a portion of certain parts in the foreground being broken out to reveal parts otherwise hidden;

Fig. 2, a top plan view, portions of the endless belt being broken out to reveal structure otherwise hidden;

Fig. 3, a fragmentary transverse section taken on the line 3—3 of Fig. 2, and drawn to a somewhat enlarged scale;

Fig. 4, a fragmentary longitudinal section taken on the line 4—4 of Fig. 2, and drawn to the scale of Fig. 3;

Fig. 5, a fragmentary vertical section taken on the line 5—5 of Fig. 2, and drawn to an enlarged scale;

Fig. 6, a transverse vertical section taken on the line 6—6 of Fig. 5;

Fig. 7, an enlarged horizontal section taken on the line 7—7 of Fig. 6, intermediate portions being broken out for convenience of illustration; and Fig. 8, a longitudinal vertical section taken on the line 8—8 of Fig. 7, showing the shear bars in detail, the rotative path of the cutter blades being partially indicated by dotted lines.

Referring to the drawings: In the illustrated instance the machine is a self-propelled, lightweight unit adapted primarily for intermittent use by poultry raisers for supplying a daily quantity of fresh greens to supplement ordinary poultry feed, though features of the invention may be embodied in other types of machines as well.

As illustrated, the machine embodies a rigid, structural frame 10 made up of lengths of metal pipe welded together. The rear end of the frame is supported by road wheels 11 carried by a differential axle 12 of automobile type, such axle and differential being conventional in all respects except for having its drive shaft 13 rising vertically rather than extending forwardly. The forward end of the frame is supported by a single road wheel 14 mounted at the lower offset portion of a steering column 15, Fig. 3. A sleeve 16 is fitted concentrically about the upper end of the steering column 15, and bears downwardly upon a collar 15a of the latter. It is connected to the frame proper, as by welding. A steering handle 17 is fixed to the upper end of the steering column 15, also preferably by welding.

Pivotally suspended from the frame 10 and the axle 12 is a floating framework, which supports the rotary cutter with its rotative axis extending transversely of the direction of travel of the machine, and upon which the endless belt is operatively mounted. Such floating framework comprises spaced side rails 18 extending longitudinally of the machine and sloping upwardly from a low point near the rear of the machine to a point disposed above and preferably forwardly of the front wheel 14, as a mounting for the endless belt conveyor mechanism, and comprises, further, longitudinally extending auxiliary members 19 stemming from fixed and preferably welded securement to structural angles 12—1, which are fixed, as by welding, to the respective side rails 18, intermediate the lengths thereof, and which serve as guides for the endless belt. Such auxiliary members 19 slope downwardly toward the rear of the machine at a less slope than the side rails 18, and serve to carry the rotary cutter assembly.

The side rails 18 are rigidly joined at their upper ends by a transverse structural member 20, Fig. 2, and, near their lower ends, by a transverse structural member 21, Fig. 5. The resulting rectangular frame has its upper end pivotally connected to the sleeve 16 by means of the links 22 and 23, Fig. 1. The lower ends of the auxiliary members 19 are rigidly interconnected by a transverse structural member 24, from which spaced arms 25 rigidly project rearwardly. The extremities of such arms 25 are pivoted to respective upstanding ears 26, which are preferably welded to the housing of axle 12, considered for this purpose to be a part of the structural frame 10.

Suitable attached, as by welding, to the lower end of the auxiliary frame formed by the longitudinal members 19 and the transverse member 24, is a housing 27 of substantially semicircular formation. Such housing extends transversely of the machine in approximately coextensive relationship with the framework described above. Journaled concentrically within the housing 27 on a shaft 28—1 is a rotary cutter 28, here shown as made up of a cylinder 29 having a plurality of blades 30 projecting tangentially therefrom. Secured to the lower leading edge of the housing, advantageously by welding is a stationary shear bar assembly 31 positioned for coaction with the revolving cutter blades 30 of the rotary cutter 28. Such shear bar assembly is made up of a transversely extending, primary shear bar member 32, having an upper shear edge 32a, and of a transverse series of mutually spaced, forwardly and longitudinally extending, advance or secondary shear bar members 33, having forward portions 33a of tooth formation, and rearward portions having upper shear edges 33b arcuately formed in concentric relationship with and disposed within the rotative path of the cutter blades 30. Thus, a relatively broad shear zone is provided by the shear bar assembly 31, such zone having a plurality of open channels 34, Figs. 6 and 7, leading thereinto.

The side rails 18 of the endless belt mounting frame have rigidly extending from their lower ends respective members 35, which receive and journal therebetween a roller 36, and have secured at their upper ends respective sleeve members 37. Slidably received within such sleeve members 37 are supporting legs 38a of respective shaft members 38, upon and between which is rotatably mounted a roller 39. Coil springs 40 are fitted within the respective sleeve members 37 for the purpose of resiliently urging the shaft members 38, and the roller 39 carried thereby, upwardly and outwardly of the frame. A flexible endless belt 41 of canvas or the like is mounted over the rollers 36 and 39 and stretched taut by the action of springs 40. Such belt 41 is provided with transverse slats 42 at intervals along its length to enable it to better serve as both a feeding device for the uncut vegetation and as a conveyor for discharging the cut and chopped material.

A suitable prime mover 43, such as a light gasoline engine, is mounted on a supporting bracket 44 welded or otherwise suitably secured to the cutter housing 27. The power output shaft 45 thereof is belted, as at 46, to the projecting end of the rotary cutter shaft 28—1 in suitable drive ratio referred to hereinafter.

The cutter shaft 28—1 also has a sprocket wheel 47 rigidly secured to its projecting end and connected in drive relationship, by means of a sprocket chain 48, with a sprocket wheel 49 fast on the projecting shaft end of roller 36. A pulley 51, also fast on such projecting shaft end of roller 36, is connected in drive relationship, by means of a belt 52, with a pulley 53 fast on a countershaft 54 journaled in a bearing standard 55. A pinion 56, fast on such countershaft 54, meshes with a bevel gear 56—1 fast on the upper end of the differential drive shaft 13. Thus, the road wheels 11 of the machine are driven, at a predetermined ratio, by the prime mover 43.

It will be noted from the above that the entire machine is powered by a simple and compact drive mechanism. It should be understood that suitable manually controlled clutch means (not shown) is provided in association with the prime mover 43 for connecting and disconnecting the drive shaft thereof with respect to the power output shaft 45.

At the elevated forward ends of the side rails 18, a hopper 57 is secured by means of a bracket arm 58 and a cradle support 59. A discharge lip 57a enables convenient manual transfer of the cut and chopped product from hopper 57 into any suitable receptacle, such as a bag.

For better directing the blast of cut and chopped vegetation to the upper run 41a of the endless belt 41, a forwardly extending hood 27—1 is attached to the housing 27. Such hood preferably has depending and inwardly directed sides 27—1a, Fig. 6.

For the purpose of maintaining the interior surfaces of the conveyor belt 41 and mechanism associated therewith free of caked vegetation, a scraper blade 60, Fig. 5, is fixed to the top of the transverse structural member 21 of the conveyor mounting frame, in surface scraping relationship with the roller 36, and a pan 61 is secured to the underside of such transverse member 21 so as to extend forwardly thereof within the interior of the belt 41. Scrapings from roller 36 are deposited in pan 61, where they may be easily removed at convenient intervals during the operation of the machine.

The respective diameters of the several pulleys, sprocket wheels, and gears of the drive arrangements are such that the conveyor belt 41 travels approximately five times the ground speed of the machine, and that the rotary cutter turns at approximately 1400 to 1500 revolutions per minute. In this way, the lower run of the endless belt 41 is able to properly tip the stems 62 of the growing vegetation into the cutting zone of the machine as the machine travels forwardly, that is to say, in the direction of the arrow, Fig. 5.

In order to raise and lower the cutter and feeder-conveyor assembly relative to the ground level, a manually-operated lever arrangement is provided. As illustrated, rigidly connected lever arms 63 and 64, Fig. 1, are pivotally mounted at their juncture 65 to the structural frame 10, the longer lever arm 63 serving as a handle, and the shorter lever arm 64 being connected by means of a link 66, to the floating framework which carries the conveyor 41 and rotary cutter 28. Thus, the operator of the machine may lower or raise such framework and the mechanism carried thereby by raising and lowering the handle 63, such handle being shown in its raised position in Fig. 1.

In operation, the operator walks beside the machine as it travels through the field, directing the travel by manipulation of the steering handle 17. When he is ready to cut forage crops growing in a field, he lowers the cutter and feeder-conveyor assembly by raising the handle 63 from its lowered position (not shown).

As the machine travels forwardly through the field, the lower run of the endless belt 41 pushes the stem 62 of the growing vegetation rearwardly and downwardly into the path of the knives 30 of the cutter 28. Cutting commences at the forward ends of the respective longitudinal shear bars 33b and continues throughout the shearing zone until the transverse shear bar 32 is passed. The stems 62 are cut in short increments, whose lengths depend upon the speed of rotation of the cutter. The fan or blower action of the cutter 28 produces a blast directed counterclockwise through the housing 27, which forcibly carries the chopped vegetation forwardly under the hood 27—1 and discharges it upon the upper run 41a of the belt 41, where it is elevated and discharged into hopper 57.

The forwardly directed tooth portions 33a of the respective longitudinal shear bar members 33 serve to lift stems from the ground for entry into the shearing zone of the machine, while the upwardly and rearwardly sloping primary shear bar member 32 prevents packing of vegetation against the ground under the action of the machine. Thus, a clean swath is cut throughout any path of travel of the machine.

The endless belt 41 has its side 41a, Fig. 2, extending beyond the rotary cutter 28 a short distance, say two inches, so as to bend down a narrow strip of vegetation in preparation for the return run of the machine through the field. Furthermore, and in this connection, the forward edge of the housing on that side of the machine is advantageously sharpened as a knife edge 67. This facilitates the obtaining of a clean and thorough cutting of all stems in successive runs of the machine through the field.

For best results in practice, I have found that the longitudinally extending, secondary shear bar members 33 should be spaced apart from approximately two to approximately four inches regardless of the size of the machine proper.

Whereas this invention is here illustrated and described with respect to a particular preferred embodiment thereof, it should be understood that various changes, apart from the mere substitution of equivalents, may be made therein and various other constructions may be adopted on the basis of the teachings hereof, by those skilled in the art, without departing from the protective scope of those of the following claims which are generic to the broader inventive concepts disclosed.

I claim:

1. In a cutting and chopping machine for field crops, a rotary cutter having its blades and rotative axis extending transversely of the direction of travel of the machine; a housing enclosing the rear portion of said cutter in spaced relationship therewith, so as to form a forwardly directed, blast passage for cut and chopped vegetation; and conveyor means disposed forwardly of and below the forwardly directed discharge end of said blast passage and in the path of discharge therefrom.

2. The combination recited in claim 1, wherein the housing is substantially semi-circular in configuration and concentrically arranged relative to the cutter.

3. In a cutting and chopping machine for field crops, a rotary cutter having its blades and rotative axis extending transversely of the direction of travel of the machine; a housing enclosing the rear portion of said cutter in spaced relationship therewith, so as to form a forwardly directed, blast passage for cut and chopped vegetation; and endless conveyor means having its lower end disposed in advance of but in close proximity to the front of said cutter, below the discharge end of said blast passage but above the cutting level of said rotary cutter, said conveyor means having its lower run at the said lower end exposed as a feeder for said cutter and having its upper run extending upwardly and forwardly as a discharge conveyor for the cut and chopped vegetation emerging from said housing.

4. The combination recited in claim 3, wherein the endless conveying means is a relatively wide belt conveyor which is offset outwardly of the machine at one side of the rotary cutter, for preparing, for the next pass of the machine through the field, a limited marginal portion of the standing crop adjacent the swath being cut.

5. The combination recited in claim 3, wherein the cutter housing has side walls, and a corresponding one of said side walls is sharpened as a trimming knife.

6. A cutting and chopping machine for field crops, comprising a structural frame; road wheels supporting said frame; a floating structural framework pivotally attached at one of its ends to an upper and forward portion of said frame and extending downwardly and rearwardly therefrom to pivotal attachment, adjacent its lower end, to a lower and rearward portion of said frame; pivot and link connecting means providing the pivotal attachments of said framework to said frame; a rotary cutter rotatably mounted in the lower rearward portion of said framework so that its blades and rotative axis extend transversely of the direction of travel of the machine; stationary shear bar means supported by said framework and mounted below said cutter; endless conveyor means operatively mounted on said framework forwardly of said cutter, and sloping forwardly and upwardly from a location in advance of but in close proximity to the cutter and shear bar arrangement, at its lower end, to a discharge at its upper end; a housing enclosing the rear portion of the cutter in spaced relationship therewith, so as to form a forwardly directed, blast passage having a discharge above the said lower end of said conveyor means and directed toward said conveyor means, for the discharge of cut and chopped vegetation onto said endless conveyor means; and drive means for the rotary cutter and the endless conveyor means.

7. The combination recited in claim 6, wherein the stationary shear bar means comprises a transversely extending shear bar which slopes upwardly and backwardly from approximately ground level to a shearing edge within the rotative path of said cutter blades.

8. The combination recited in claim 7, wherein a transverse series of mutually spaced, advance shear bars extend longitudinally and forwardly from the transversely extending shear bar, within the rotative path of said cutter blades.

9. The combination recited in claim 6, wherein the endless conveyor means includes a belt mounted on spaced rollers; and wherein mechanism is provided between the upper and lower runs of said belt for preventing caking of cut vegetation on the interior surfaces thereof, said mechanism comprising a scraper blade operatively mounted against the surface of the lower of said rollers, and a pan disposed adjacent said scraper blade for receiving the scrapings therefrom.

10. In a cutting and chopping machine for field crops, cutting and chopping means; an endless belt conveyor mounted on spaced rollers in proximity to said cutting and chopping means; and mechanism between the upper and lower runs of said conveyor belt for preventing caking of cut vegetation on the interior surfaces thereof, said mechanism comprising a scraper blade operatively mounted against the surface of the lower of said rollers, and a pan disposed adjacent said scraper blade for receiving the scrapings therefrom.

References Cited in the file of this patent

UNITED STATES PATENTS

| Number | Name | Date |
|---|---|---|
| 404,691 | Deland | June 4, 1889 |
| 435,389 | Braithwaite | Sept. 2, 1890 |
| 865,161 | Coldwell | Sept. 3, 1907 |
| 1,060,283 | Phillips | Apr. 29, 1913 |
| 1,370,352 | Parmley | Mar. 1, 1921 |